(12) United States Patent
Makuth et al.

(10) Patent No.: US 11,777,967 B2
(45) Date of Patent: Oct. 3, 2023

(54) RECOGNIZING DEVIATIONS IN SECURITY BEHAVIOR OF AUTOMATION UNITS

(71) Applicants: Jens Makuth, Feucht (DE); Jürgen Schimmer, Nuremberg (DE)

(72) Inventors: Jens Makuth, Feucht (DE); Jürgen Schimmer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 396 days.

(21) Appl. No.: 16/701,816

(22) Filed: Dec. 3, 2019

(65) Prior Publication Data

US 2020/0177610 A1 Jun. 4, 2020

(30) Foreign Application Priority Data

Dec. 3, 2018 (EP) ..................................... 18209769

(51) Int. Cl.
*H04L 9/40* (2022.01)
*H04L 43/16* (2022.01)
(Continued)

(52) U.S. Cl.
CPC ........... *H04L 63/1425* (2013.01); *G06N 3/08* (2013.01); *H04L 67/12* (2013.01)

(58) Field of Classification Search
CPC ............. H04L 63/1425; H04L 63/1458; H04L 2463/142; H04L 2463/141; H04L 63/1408; G06N 3/08; H04W 4/029
See application file for complete search history.

(56) References Cited

U.S. PATENT DOCUMENTS 8,577,705 B1 11/2013 Baboo et al.
10,148,680 B1 * 12/2018 Segev ................. H04L 63/1425
(Continued)

FOREIGN PATENT DOCUMENTS

CN 1910625 A 2/2007
CN 103248607 A 8/2013
(Continued)

OTHER PUBLICATIONS

Li et al., "A Geometric Approach to Clustering Based Anomaly Detection for Industrial Applications," IECON 2018—44th Annual Conference of the IEEE Industrial Electronics Society Year: 2018 | Conference Paper | Publisher: IEEE.*
(Continued)

*Primary Examiner* — Roderick Tolentino
(74) *Attorney, Agent, or Firm* — Lempia Summerfield Katz LLC

(57) ABSTRACT

A method, an intelligent switch, a device, and a network for recognizing deviations in communication behavior of the network are provided. Characteristics of communication are monitored and evaluated regarding security behavior of the network using a model of a communication behavior of the network. For each communication over a switch of the network, at most three security values are derived from communication metadata of the respective communication using the model of the communication behavior. For each communication, it is checked whether the respective at most three security values meet respective predetermined threshold values. When the respective predetermined threshold values are not met by at least one of the security values, a security warning is generated.

21 Claims, 3 Drawing Sheets

(51) Int. Cl.
*G06N 3/08* (2023.01)
*H04L 67/12* (2022.01)

(56) References Cited

U.S. PATENT DOCUMENTS

| | | | |
|---|---|---|---|
| 11,055,383 B2* | 7/2021 | Dimerman | G06F 16/2477 |
| 2007/0165948 A1 | 7/2007 | Laffargue et al. | |
| 2009/0037363 A1* | 2/2009 | Kozlov | G06F 16/21 |
| 2009/0044276 A1* | 2/2009 | Abdel-Aziz | H04L 63/1425 |
| | | | 711/E12.091 |
| 2012/0137361 A1 | 5/2012 | Yi | |
| 2015/0106316 A1 | 4/2015 | Birdwell et al. | |
| 2016/0028750 A1* | 1/2016 | Di Pietro | H04W 12/125 |
| | | | 726/23 |
| 2016/0105338 A1 | 4/2016 | Fletcher et al. | |
| 2017/0093902 A1 | 3/2017 | Roundy | |
| 2017/0207949 A1 | 7/2017 | Donovan | |
| 2017/0352245 A1* | 12/2017 | Maher | G08B 21/182 |
| 2017/0357940 A1 | 12/2017 | Radhakrishnan | |
| 2018/0124076 A1* | 5/2018 | Zibuschka | H04L 63/1491 |
| 2018/0211176 A1* | 7/2018 | Khurshudov | G05B 19/406 |
| 2019/0042743 A1* | 2/2019 | Chen | G06N 20/00 |
| 2019/0310592 A1* | 10/2019 | Hazard | G05B 13/029 |

FOREIGN PATENT DOCUMENTS

| | | |
|---|---|---|
| CN | 108304516 A | 7/2018 |
| WO | WO2018141432 A1 | 8/2018 |

OTHER PUBLICATIONS

Jamdagni et al., "Intrusion Detection Using Geometrical Structure," 2009 Fourth International Conference on Frontier of Computer Science and Technology Year: 2009 | Conference Paper | Publisher: IEEE.*

European Search Report for European Patent Application No. 18209769.1-1213 dated Apr. 5, 2019.

Shiguo, Jia et al: "Design and implementation of network intrusion detection system based on data mining" Computer Engineering and Applications, vol. 44, No. 14, pp. 134-137. DOI: 10.3778, ISSN 1002-8331, 2008; abstract.

Chinese Office Action for Chinese Application No. 201911214063.6 dated Oct. 20, 2021.

European Decision to Grant for European Application No. 18 209 769.1-1213 dated Oct. 8, 2021.

* cited by examiner

RECOGNIZING DEVIATIONS IN SECURITY BEHAVIOR OF AUTOMATION UNITS

This application claims the benefit of European Patent Application No. EP 18209769.1, filed on Dec. 3, 2018, which is hereby incorporated by reference in its entirety.

BACKGROUND

The present embodiments relate to recognizing deviations in communication behavior of a network.

Automation technology used to have a simple structure. A controller of an automation unit controlled functional units of the automation unit. In bigger automation sites, multiple automation units were communicatively connected with each other by an industrial network. However, nowadays, most automation units from simple home appliances over smart homes to industrial manufacturing plants are not isolated but laterally connected to other entities, especially over the Internet. In the course of increasing digitalization and, for example, in the course of the Internet of Things (IoT) trend nearly every up-to-date automation unit is connectable to the Internet. With increasing interconnection between the information technology (IT) world and the automation (AT) world via the Internet, problems formerly specific to the IT world gain more and more influence in the AT world, too. Especially, security issues become relevant for automation units as soon as these units are not closed any more but connected to the Internet and thus open for attacks from the outside.

The security issues are various. Mostly malware (e.g., computer worms like Stuxnet) is introduced to networks like the Internet for performing manipulations on endpoints of the network (e.g., automation units). But also, spyware is introduced for acquiring know-how (e.g., processes, methods, recipes, characteristic factors of the production like lot size, throughput, efficiency, etc.) from endpoints (e.g., automation units, etc.). Further, "denial of service"-attacks for blocking or delaying of communications are used to harm, for example, the production in an automation cell or unit.

Known countermeasures are usage of antivirus software, hardening the device at the endpoint, and controlling terminal ports. Antivirus software analyzes signatures of software based on known virus patterns or monitors behavior of programs. For controlling gateways, firewalls, flite, proxies, and the like are used especially in combination with certain network architectures in order to avoid infecting a big network with many endpoints at one go.

However, each of the known countermeasures is either specific to the type of security issue or does need information about the malware/spyware (e.g., signature) to be able to protect an endpoint and/or network.

SUMMARY AND DESCRIPTION

The scope of the present invention is defined solely by the appended claims and is not affected to any degree by the statements within this summary.

The present embodiments may obviate one or more of the drawbacks or limitations in the related art. For example, these drawbacks or limitations are overcome or alleviated by a method, a switch, a device, and a system of the present embodiments.

According to a first aspect, a method of recognizing deviations in communication behavior of a network (e.g., of an automation network) includes collecting communication metadata in a switch of the network. The communication metadata includes data about characteristics of each communication over the switch. For each communication over the switch, at most three security values are derived from the communication metadata of the respective communication using a model of the communication behavior of the network. For each communication, it is checked whether the respective at most three security values meet respective predetermined threshold values. A security warning is generated in case at least one of the security values does not meet the respective predetermined threshold values.

All or part of the above acts may be executed in parallel.

According to a second aspect, an intelligent switch for recognizing deviations in communication behavior of a network (e.g., of an automation network) is arranged and configured for implementing and executing the method according to the first aspect. The intelligent switch includes a metadata module, a model of the communication behavior of the network, and a security module. The metadata module and/or the security module may be formed by one or more processors. The metadata module is arranged and configured for collecting communication metadata in the intelligent switch. The communication metadata includes data about characteristics of each communication over the intelligent switch. The model of the communication behavior is communicatively coupled to the metadata module. The model of the communication behavior is arranged and configured for deriving, for each communication over the intelligent switch, at most three security values from the communication metadata of the respective communication. The security module is communicatively coupled to the model of the communication behavior. The security module is arranged and configured for checking, for each communication, whether the respective at most three security values meet respective predetermined threshold values. The security module is further arranged and configured for generating a security warning in case at least one of the security values does not meet the respective predetermined threshold values.

According to a third aspect, a device for recognizing deviations in communication behavior of a network (e.g., of an automation network) is arranged and configured for implementing and executing the method according to the first aspect. The device is communicatively connectable to a switch of the network. The device includes a model of the communication behavior of the network and a security module. The model of the communication behavior is arranged and configured for deriving, for each communication over the switch, at most three security values from communication metadata of the respective communication fetched from the switch. The communication metadata includes data about characteristics of each communication over the switch. The security module is communicatively coupled to the model of the communication behavior. The security module is arranged and configured for checking for each communication whether the respective at most three security values meet respective predetermined threshold values. The security module is further arranged and configured for generating a security warning in case at least one of the security values does not meet the respective predetermined threshold values.

According to a fourth aspect, a network (e.g., an automation network) is arranged and configured for recognizing deviations in communication behavior of the network. The network includes at least two network cells, an intelligent switch according to the second aspect or a regular switch and a device according to the third aspect. The at least two network cells are communicatively connected over the network. The device according to the third aspect is communicatively connected or coupled to the regular switch. The intelligent switch according to the second aspect or the regular switch is located at a central connection point of the at least two network cells in the network.

The present embodiments are, for example, applicable to industrial networks used for automation units (e.g., automation networks). The network may have a ring topology or a star topology.

In the context of the present embodiments, the term communicatively connected provides that two entities of a network are able to communicate with each other either directly or over one or more further entities (e.g., switches) in the network. In the context of the present embodiments, coupled (e.g., communicatively coupled) provides that two entities of a network are able to communicate with each other directly via a direct connection without any further entities in between.

In the context of the present embodiments, one communication is the transport (e.g., sending and receiving) of at least one message from a sender to a receiver. For example, in a packet based or packet switched network, sending and receiving (e.g., transport) of the at least one message is realized in a form of at least one packet including at least a part of the at least one message as data and optionally a header and/or a footer or any further metadata.

In one embodiment, the respective switch (e.g., intelligent switch), from which the metadata is fetched, is located at a central connection point of the network. The central connection point may be a point in the network where all connections between all entities (e.g., the network cells or other units) of the network come together such that all communications in the network run over that one connection point and thus over the respective switch (e.g., intelligent switch). In that case, all data traverses the respective switch (e.g., intelligent switch) on its way from a sender to a receiver (e.g., from one of the network cells to the other).

In the context of the present embodiment, communication metadata includes data about characteristics of a single communication. The communication metadata contains at least ten values characterizing the respective single communication. The values of the communication metadata may include latency, transfer rate, baud rate, size of the packet, duration of the communication, delay time, transit time, etc. For example, the communication metadata may include the following values: a packet number giving the total number of packets sent in the communication; a current packet count (e.g., packets per second (pkts/s)) giving the current count of packets sent per time unit (e.g., seconds) in the communication; an average packet count (e.g., pkts/s) giving the average count of packets sent per time unit (e.g., seconds) in the communication; a minimal packet count (e.g., pkts/s) giving the minimal count of packets sent per time unit (e.g., seconds) in the communication; a maximal packet count (e.g., pkts/s) giving the maximal count of packets sent per time unit (e.g., seconds) in the communication; a current data count (e.g., kilobit per second (kbps)) giving the current count of data sent per time unit (e.g., seconds) in the communication; an average data count (e.g., kbps) giving the average count of data sent per time unit (e.g., seconds) in the communication; a minimal data count (e.g., kbps) giving the minimal count of data sent per time unit (e.g., seconds) in the communication; a maximal data count (e.g., kbps) giving the maximal count of data sent per time unit (e.g., seconds) in the communication.

The switch (e.g., intelligent switch) of the network is monitored with respect to the communications running over the switch or rather forwarded by the switch. In the switch, communication metadata of each single communication is collected and stored. Each communication over the switch is therefore characterized by values such as, for example, latency, transfer rate, baud rate, size of the packet, duration of the communication, delay time, transit time, etc. included by the communication metadata of the respective communication.

All the communication metadata of the communications over the switch is provided to the model of the communication of the network, which derives at most three security values based on the communication metadata. The communication metadata may be fetched from the switch or rather from the metadata module of the intelligent switch by the device according to the third aspect or the model of the communication behavior.

The model of the communication behavior of the network may select only values from the communication metadata that are related or contribute to evaluation of the security of the network. The selection of the values may be effected by weighting the values with respective weights in order to increase or decrease an influence to the evaluation of the security of the network. Based on all or the selected/weighted values of the communication metadata, the model of the communication behavior derives at most three security values for each communication over the switch. These security values resemble the current communication behavior of the network. The at most three security values describe a communication over the switch only considering security relevant data of communication metadata. The derived at most three security values enable an indication of the current security status of the network based on a communication behavior that is derived from the communications over the switch.

The derived at most three security values are compared to the respective threshold values. There may be defined upper limits, lower limits, and/or a multitude of intervals each having an upper and a lower limit as threshold values for each security value. The threshold values may be derived automatically during generation of the model of the communication behavior of the network.

Each time a communication over the switch or rather derived security values do not conform to the threshold values a security warning is generated. The security warning may be issued on a display or via a loudspeaker (e.g., network administrator) or sent as a message (e.g., email, notification, SMS, push-message, etc.) to a user. The user may decide based on the security warning, whether counter measures like encapsulating an affected network cell or the whole network are to be initiated. Further, the security warning may also be used for automatic triggering of counter measures (e.g., encapsulating an affected network cell or the whole network).

The present embodiments using analysis of communication metadata by a trained ANN enables detection of any deviations in the communications from the communications of the normal working network. Thus, even new and unknown security issues like new malware or spyware may be detected based on the impact and influence on the communications in the network over the monitored switch.

According to a refinement of the present embodiments, two security values or three security values are derived for each communication in the act of deriving. The two security values or three security values define a security point of the respective communication in a two-dimensional (2D) domain or a three-dimensional (3D) domain.

The model of the communication behavior is arranged and configured for deriving two or three security values from the communication metadata. The values characterizing each communication over the switch are analyzed by the model of the communication behavior regarding security relevant aspects and combined into the two or three security values. The two security values define a 2D security point (e.g., in Cartesian coordinates). The three security points define a 3D security point (e.g., in Cartesian coordinates).

The derivation of two or three security values effects a reduction of complexity, where 2D or 3D security points based on two or three security values are better imaginable and understandable for users (e.g., humans) then more dimensional security points. The values of the metadata are not converted too much (e.g., into one single security value), such that a sufficient amount of information from the original communication metadata is preserved. Thus, an understandable and precise indication of the security status of the network is provided.

According to a refinement, the method further includes spanning a 2D envelope in the 2D domain or a 3D envelope in the 3D domain based on the threshold values.

The 2D envelope defines a threshold area in the 2D domain. The 3D envelope defines a threshold space in the 3D domain. In the threshold area and the threshold space, respectively, all respective threshold values are met by the respective security points. It is checked for each communication whether the security point lies inside the 2D envelope or the 3D envelope, inside and on the 2D envelope or the 3D envelope, or inside, on, and within a predetermined distance from the 2D envelope or the 3D envelope in the act of checking.

The act of spanning may be executed in parallel with the remaining acts.

The 2D/3D envelope enables simple geometrical checking of the 2D/3D security points of the communications over the switch instead of many comparisons with two or three threshold values. Further, a distance of the 2D/3D security points to the 2D/3D envelope may be determined and used for further security analysis of the respective communications (e.g., the greater the distance the greater the deviation from the normal communication behavior, which may be the result of a more severe security issue).

According to a refinement of the present embodiments, the method further includes displaying the security points and the envelope on a display.

The act of displaying may be executed in parallel with the remaining acts.

The 2D/3D security points of the communications and the respective 2D/3D envelope are displayed to a user. The display may be a monitor or a printout (e.g., from a printer) or, for example, for 3D security points and 3D envelops, a virtual reality headgear/3D-googles. The 2D/3D security points of all communications or only the current 2D/3D security points of the latest communications (e.g., the last 100 or the last 1000) may be displayed to the user.

Such graphical representation of the security status is easy understandable for human users such that the users may quickly decide on proper counter measures in case a security issue is evident based on the displayed security points.

According to a refinement of the present embodiments, the security warning is generated in case at least one of the security values does not meet the respective predetermined threshold value for a predefined number of communications and/or for a predefined duration in the act of generating.

As the network is a dynamic system, which does not always behave in the same way during normal operation (e.g., due to influences from the environment/noise), not every deviation from the normal communication behavior (e.g., all security values/points within the respective thresholds/envelope) are to be the result of a security issue. Thus, a security warning is issued only if an amount of communications equal to or higher than the predefined number deviate with security values/point from the normal communication behavior characterized by the threshold values/envelope. Alternatively or additionally, a security warning is issued if all or part of the communications within the predefined duration deviates from the normal communication behavior. Thereby, either only one of the security values may not suffice for several communications or any of the security values may not suffice for several communications. Also, a security warning may be issued only if one certain communication (e.g., from one particular sender to one particular receiver) or type of communication (e.g., messages incoming from the Internet, control signals sent by a controller, etc.) is not behaving like normal (e.g., not suffice for several times in a row or in a predefined time interval or with a predefined maximal timespan between each not-sufficing).

The predefined number of communications and/or the predefined duration enables avoiding issuance of false security warnings.

According to a refinement of the present embodiments, the communication metadata are pre-processed with a data cleansing function determining valid data of the communication metadata in the act of deriving. Only the determined valid data is provided to the model of the communication behavior for deriving the at most three security variables.

Before the communication metadata is fed to the model of the communication behavior, a prior data cleansing may be executed. In the data cleansing, values about characteristics of a single communication of the communication metadata that are erroneous, incomplete, illogical, and/or unexpected are automatically removed. Thus, only cleaned and thus valid values of the communication metadata including valid information about the communications over the switch (e.g., (intelligent switch) are considered and used for deriving the at most three security values by the model of the communication behavior.

The data cleansing function provides that the current communication behavior of the network is assessed based on security values/points that are exclusively derived from valid data/values of the communication metadata. Consequently, the reliability of the current communication behavior of the network is increased.

According to a refinement of the present embodiments, the model of the communication behavior is derived from training communication metadata by a forward feature selection algorithm and/or a backward feature selection algorithm for deriving at most three security values. The at most three security values describe a communication over the switch only considering security relevant data of communication metadata.

The training communication metadata is communication metadata from communications of a network provided for deriving a model of the communication behavior of the respective network. The forward feature selection algorithm and/or a backward feature selection algorithm is used for determining the security relevant data from the communication metadata. The used algorithms (e.g., forward/backward) may be brute-force-algorithms based on trial-and-error or Gauss-based algorithms based on optimization functions. The forward/backward feature selection algorithm may be supported by a "notebook"-approach like the Jupiter Notebook or Apache Zeppelin web applications.

The forward/backward selection algorithm provides for a robust model that may be used for deriving the at most three security values with little computational effort.

According to a refinement of the present embodiments, the forward feature selection algorithm and/or the backward feature selection algorithm is a support vector machine (SVM), a robust covariance, or an Isolation Forrest algorithm.

The SVM, robust covariance, and Isolation Forrest algorithms are robust algorithms for deriving the model of the communication behavior.

According to a further refinement of the present embodiments, the model of the communication behavior is based on an artificial neuronal network (ANN). The ANN is trained with training communication metadata for deriving at most three security values. The at most three security values describe a communication over the switch only considering security relevant data of communication metadata.

The ANN is trained such that only values of the communication metadata that are related to or contribute to evaluation of the security of the network are considered. This may be effected by adapting weights of the ANN such that only the relevant data/values of the communication metadata are considered for deriving the at most three security values. Even complex dependencies of multiple values of the communication metadata related to or contributing to security of the network are considered by the trained ANN.

The ANN provides for reliable security values/points even in networks with complex architecture and many dependencies.

According to a further refinement of the present embodiments, the model of the communication behavior is derived from training communication metadata by an analytical algorithm for deriving at most three security values. The at most three security values describe a communication over the switch only considering security relevant data of communication metadata.

An analytically derived model of the communication behavior is particularly precise and additionally not computationally intensive in deriving the at most three security values According to a refinement of the present embodiments, the training communication metadata is pre-processed with a data cleansing function determining valid training data of the training communication metadata. Only the determined valid training data is used for deriving the model of the communication behavior.

Before the training communication metadata is processed in order to generate the model of the communication behavior (e.g., feature selection algorithm, ANN, or analytical algorithm), a prior data cleansing may be executed. In the data cleansing training, values about characteristics of a single communication of the training communication metadata that are erroneous, incomplete, illogical, and/or unexpected are automatically removed. Thus, only cleaned and thus valid training values of the training communication metadata including valid information about the communications over the switch (e.g., intelligent switch) are considered and used for deriving the model of the communication behavior.

The data cleansing function provides that the model of the communication behavior of the network is based on valid training data/values of the training communication metadata. Consequently, the reliability of the model of the communication behavior is increased. Further, in case the model of the communication behavior is based on an ANN, the training with valid training data/values allows for a less complex ANN, as less training values/data are considered.

According to a refinement of the present embodiments, the model of the communication behavior is derived from training communication metadata of communications in a regularly working network.

The communication in the network while the network is in a state of regular working provides for information about the regular communication behavior of the network when no security issue is present. These training communication metadata of regular communications of the network for which the model of the communication behavior is to be derived enable deriving of a model of the communication behavior (e.g., feature selection algorithm/ANN/analytical algorithm) that is able to discern between a regular working state with regular communication behavior of the respective network and an irregular working state that may be caused by a security issue (e.g., spyware, malware, etc.). For example, when the model is derived based on training communication metadata of communications in a regularly working network, the threshold values may be derived based on the regular communication behavior of the regularly working network. Thus, the predetermined threshold values for the security values may be automatically derived based on the training communication metadata of communications in the respective regularly working network.

With the training communication metadata of communications in a regularly working network, a robust model of the communication behavior of the respective network may be derived. Additionally, the threshold values may be automatically derived.

According to a refinement of the present embodiments, the model of the communication behavior is derived from training communication metadata of communications in a network related to known attacks on the network.

The communication in the network while the network is under attack of a known attack or known security issue (e.g., malware, spyware etc.) and thus in a state of irregular working provides for information about the irregular communication behavior of the network when a known security issue is present. These training communication metadata of irregular communications of the network for which the model of the communication behavior is to be derived enable deriving of a model of the communication behavior (e.g., feature selection algorithm/ANN/analytical algorithm) that is able to identify the security issue or class of security issue that is causing the irregular working state. Further, when the ANN is trained with communication metadata of communications in a network that are related to known attacks on the network (e.g., communication caused by malware, spyware, etc.), the threshold values for the security values may be further refined (e.g., limited/restricted) based on the behavior of the network under attack of a known security issue.

Thus, the derived model of the communication behavior is able to directly identify any known security issues causing an irregular communication behavior of the respective network (e.g., if communication metadata from the respective network being under attack of the present security issue has been used for deriving the used model of the communication behavior). Additionally, the threshold values may be automatically refined.

According to a refinement of the present embodiments, the model of the communication behavior is derived from training communication metadata of communications in an actually existing and/or currently operating network.

An existing network (e.g., an existing manufacturing plant having several automation units connected via an industrial network) may be expanded with an intelligent switch according to the second aspect or with a regular switch and a device according to the third aspect. The intelligent switch/device includes a model of the communication behavior of the existing network merely by reading out the communication metadata of communications in the existing network while the existing network is working.

Consequently, existing networks may be expanded such the existing networks are able to recognize deviations in communication behavior and thus discover security issues without or with only minimal downtime of the existing network. Further, the thus derived model of the communication behavior is exactly fitted to the existing network.

According to a refinement of the present embodiments, the model of the communication behavior is derived from training communication metadata of communications in a digital twin of the network.

The model of the communication behavior of the network may be derived based on the communications simulated in a digital-twin (e.g., digital model) of the network. In the digital-twin, which models only but all relevant entities of the network, the communication metadata of simulated communication (e.g., regular and/or irregular) is used to derive the model of the communication behavior of the real network.

For example, directly after laying out an automation unit or manufacturing plant and before the automation unit/manufacturing plant is set up (e.g., even before the real automation unit/manufacturing plant is built in the real world) and connected to the Internet, the respective model of the communication behavior of the real network (e.g., not yet existing real network) may be generated. Thus, as soon as the respective real network of the automation unit/manufacturing plant is used, security may be observed by any of the aspects according to the present embodiments. Thus, no security gap between setup of the automation unit/manufacturing plant and start-up exists.

According to a refinement of the present embodiments, the device according to the third aspect is an edge device coupleable to the switch.

An edge-device (e.g., separate computer) may be retrofitted and connected to an existing switch of an existing network even during runtime. Thus, the existing switch does not have to be replaced with an intelligent switch according to the second aspect. Further, the separate edge-device has sufficient computing power for running the ANN such that the existing switch is not overloaded due to additional computational tasks.

BRIEF DESCRIPTION OF THE DRAWINGS

The present embodiments and a technical field of the present embodiments are explained in further detail below with reference to exemplary embodiments shown in the drawings. The exemplary embodiments are not to be construed as limiting for the scope of the present invention. Particularly, it is possible to extract aspects of the subject-matter described in the figures and to combine the extracted aspects with other components and findings of the present description or figures, if not explicitly described differently. Same reference signs refer to the same objects, such that explanations from other figures may be supplementally used.

DETAILED DESCRIPTION

Figure 1:
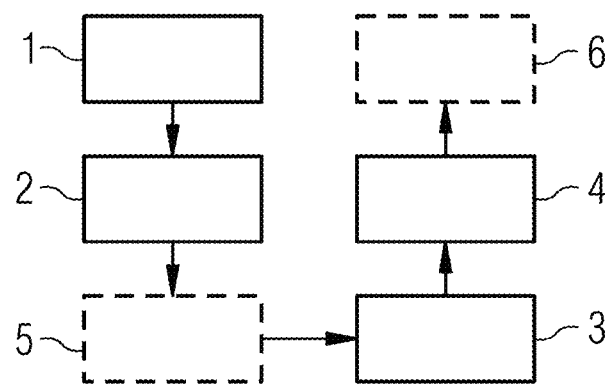
FIG. 1 shows a schematic flowchart of one embodiment of a method.

In FIG. 1, a flowchart of a method of recognizing deviations in communication behavior of a network according to a first aspect is schematically depicted. In an act of collecting 1, communication metadata is collected. In an act of deriving 2, three security values are derived. In an act of checking 3, the security values are checked. In an act of generating 4, a security warning is generated. Further, in an optional act of spanning 5, a three-dimensional (3D) envelope is spanned based on threshold values, and in an optional act of displaying 6, 3D security points and the 3D envelope are displayed.

The collecting 1 may be a collecting of communication metadata in or a fetching of the communication metadata from a switch of the network. Each communication includes sending at least one message from a sender to a receiver where the message is received for further processing. The message may be sent via at least one packet, where the packet includes data of at least a part of the message and optionally a header and/or a footer and/or further metadata. When the at least one message or packet is sent over the switch, communication metadata is generated. The communication metadata includes data about characteristics of each communication over the switch: a packet number giving the total number of packets sent in the communication; a current packet count (e.g., packets per second (pkts/s)) giving the current count of packets sent per time unit (e.g., seconds) in the communication; an average packet count (e.g., pkts/s) giving the average count of packets sent per time unit (e.g., seconds) in the communication; a minimal packet count (e.g., pkts/s) giving the minimal count of packets sent per time unit (e.g., seconds) in the communication; a maximal packet count (e.g., pkts/s) giving the maximal count of packets sent per time unit (e.g., seconds) in the communication; a current data count (e.g., kilobit per second (kbps)) giving the current count of data sent per time unit (e.g., seconds) in the communication; an average data count (e.g., kbps) giving the average count of data sent per time unit (e.g., seconds) in the communication; a minimal data count (e.g., kbps) giving the minimal count of data sent per time unit (e.g., seconds) in the communication; a maximal data count (e.g., kbps) giving the maximal count of data sent per time unit (e.g., seconds) in the communication.

In the deriving 2, for each communication over the switch, three security values are derived from the communication metadata of the respective communication. Each set of three security values of a respective communication defines a security point of the respective communication in 3D Cartesian coordinates. The deriving 2 is effected by a model of the communication behavior of the network. The model of the communication behavior may be derived from training communication metadata of communications over the switch in the network. The training communication metadata is collected in the network or a simulated digital twin of the network while regularly working and/or while under attack of a known security issue and thus irregularly working. The model may be derived by a forward feature selection algorithm and/or a backward feature selection algorithm (e.g., a support vector machine, a robust covariance, or an Isolation Forrest algorithm) for deriving at most three security values describing a communication over the switch only considering security relevant data of communication metadata. Alternatively, the model may be derived by an analytical algorithm for deriving at most three security values describing a communication over the switch only considering security relevant data of communication metadata. Further, alternatively, the model may be based on an artificial neuronal network (ANN) that was trained with the training communication metadata for deriving at most three security values describing a communication over the switch only considering security relevant data of communication metadata.

In the optional spanning 5, the 3D envelope is spanned in the 3D domain. The 3D envelope defines a space in 3D Cartesian coordinates where all respective threshold values are met by the respective security points. The predetermined threshold values are automatically determined during deriving of the model or training of the ANN. The regular communication behavior of the network is described by the 3D envelope (or rather by the threshold values).

During checking 3, for each communication, it is checked whether the respective security point lies within or on the 3D envelope (e.g., whether the three security values meet the respective predetermined threshold values). If a security point lies outside the 3D envelope, then the respective communication in the network is an irregular communication that may be caused by a security issue (e.g., malware or spyware) the network has been infected with.

In case at least one security point lies outside the 3D envelope (e.g., at least one of the security values does not meet the respective predetermined threshold values), the security warning is generated. In order to avoid false alarms due to disturbances of the network from the outside not related to a security issue, the generating 4 may be restricted to cases where a predefined number of communications in a row and/or within a predefined duration do not meet the criteria for a regular communication defined by the 3D envelope (e.g., predetermined threshold values). The security warning may be displayed on a monitor or played via a speaker or forwarded as a message to a user (e.g., a network administrator).

The 3D security points of all or a predefined number of recent communications over the switch and the 3D envelope may be displayed to the user on a monitor or by virtual reality headgear/3D-googles.

In case a security warning is generated, counter measures may be automatically initiated. Such counter measures (e.g., encapsulating the respective network cell or the whole network) are well known and thus not further discussed.

Figure 2:
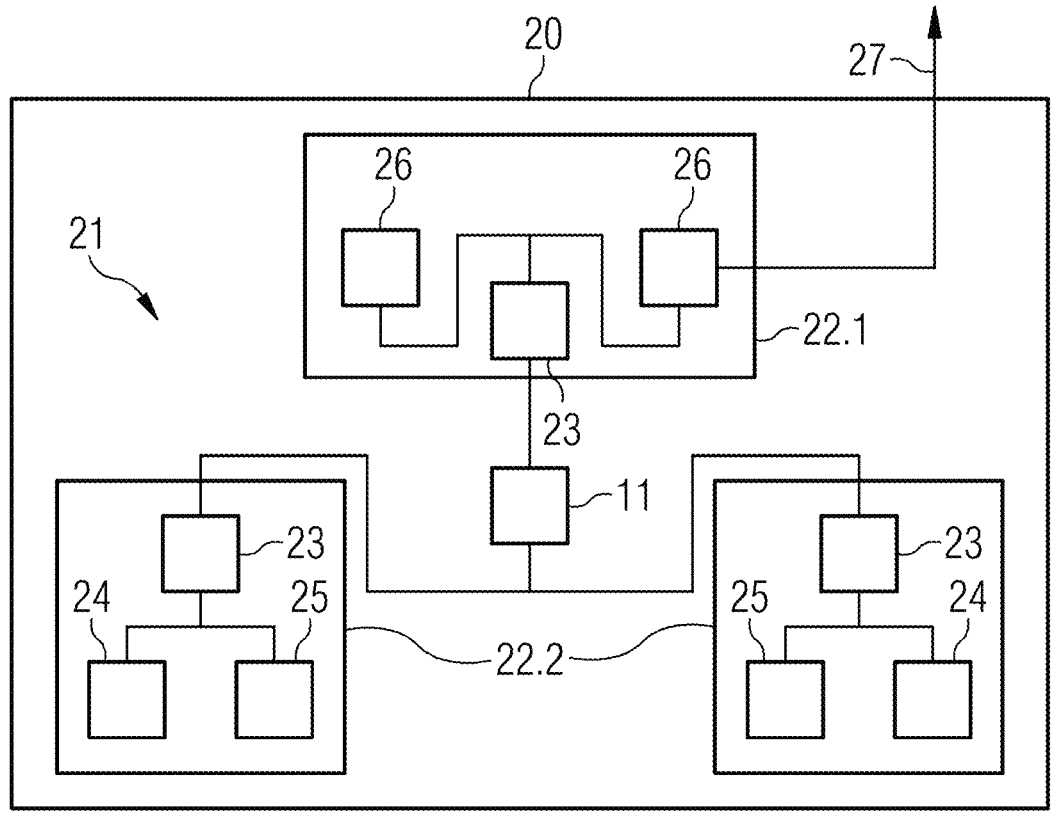
FIG. 2 shows a schematic view of one embodiment of a system including a network with an intelligent switch.

In FIG. 2, one embodiment of a system 20 including a network 21 with an intelligent switch 11 for recognizing deviations in communication behavior of the network 21 is schematically depicted. The system 20 is an automation unit. The network 21 includes three network cells 22.1, 22.2, where one network cell is a control cell 22.1 and the remaining two network cells 22.2 are regular network cells 22.2. The network cells 22.2 each belong to a respective automation cell of the automation unit 20. The control cell 22.1 and the two network cells 22.2 are communicatively connected via the intelligent switch 11. Each of the network cells 22.2 includes a switch 23. Network entities like controllers 24 and automation devices 25 (e.g., sensors, actors, etc.) of the network cells 22.2 are communicatively connected via the respective switch 23 that communicatively connects the respective network cell 22.2 with the network 21. The control cell 22.1 also includes a switch 23 connecting the control cell 22.1 to the network 21. Further, the control cell 22.1 includes at least one computer 26 (e.g., a control terminal or PC and the like). One computer 26 may have a connection 27 to the internet through which malware, spyware, and other security issues may infect and attack the network 21.

The intelligent switch 11 is arranged and configured for implementing and executing the method of FIG. 1. Thereto, the intelligent switch 11 includes a metadata module, a model of the communication behavior of the network 21, and a security module. The metadata module is communicatively connected to the model of the communication behavior, which is communicatively connected to the security module. The metadata module is arranged and configured for implementing and executing the collecting 1 according to the method of FIG. 1. The model of the communication behavior is arranged and configured for implementing and executing the deriving 2 of the method of FIG. 1. The security module is arranged and configured for implementing and executing the generating 4 and, optionally, the spanning 5 of the method of FIG. 1. The displaying may be executed by one of the computers 26 having a corresponding monitor or VR-headgear/3D-glasses.

In case the network 21 is attacked from the Internet with a malware like a worm, the regular communication behavior of the network 21 changes to an irregular communication behavior. This irregular communication behavior is resembled in the respective communication metadata that is translated into respective irregular security points by the model of the communication behavior of the intelligent switch 11. The irregular security points lie outside the 3D envelope, and thus, a security warning is generated by the security module of the intelligent switch 11. Optionally, the intelligent switch 11 may automatically initiate counter measures in response to the security issue detected based on the irregular communication over the intelligent switch 11.

Figure 3:
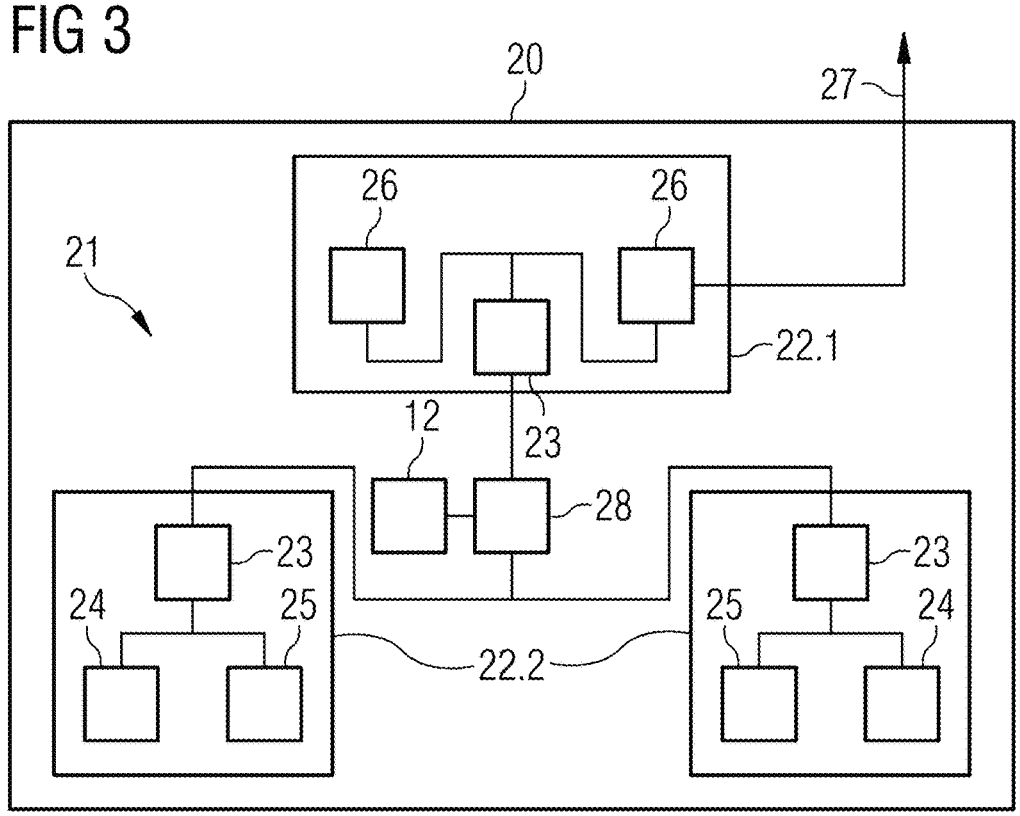
FIG. 3 shows a schematic view of one embodiment of a system including a network with a regular switch and a device.
Figure 4:
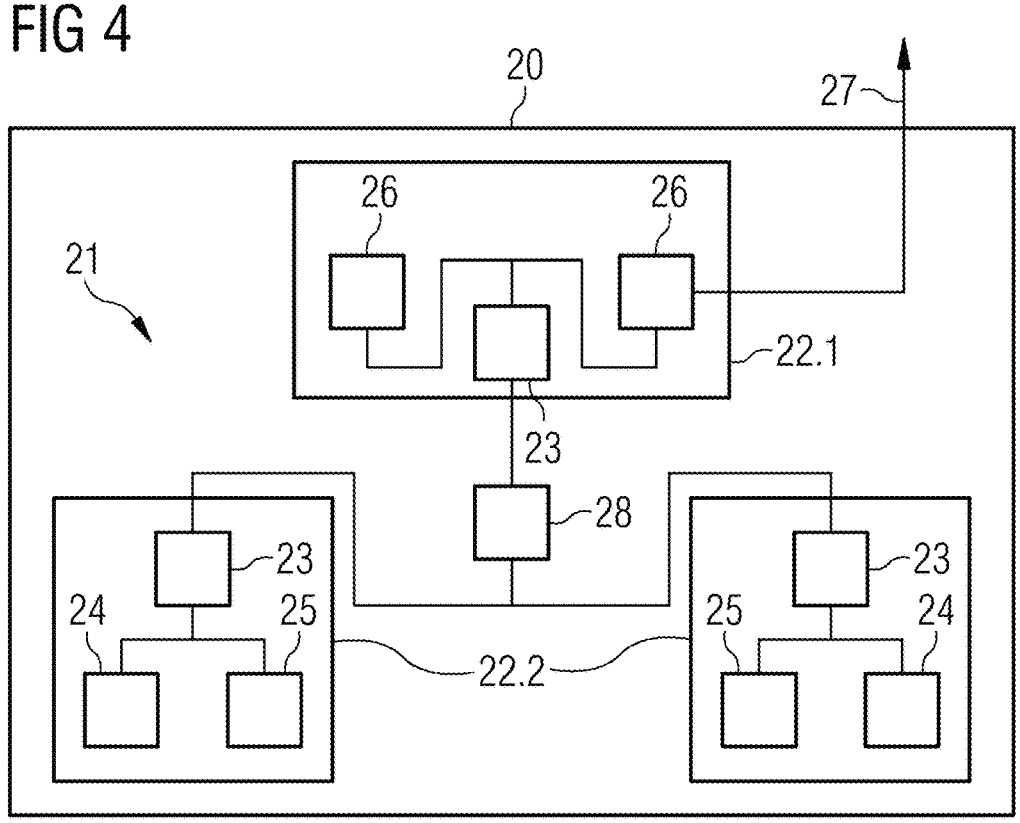
FIG. 4 shows a schematic view of one embodiment of a system including a network with a regular switch and another embodiment of the device.
Figure 5:
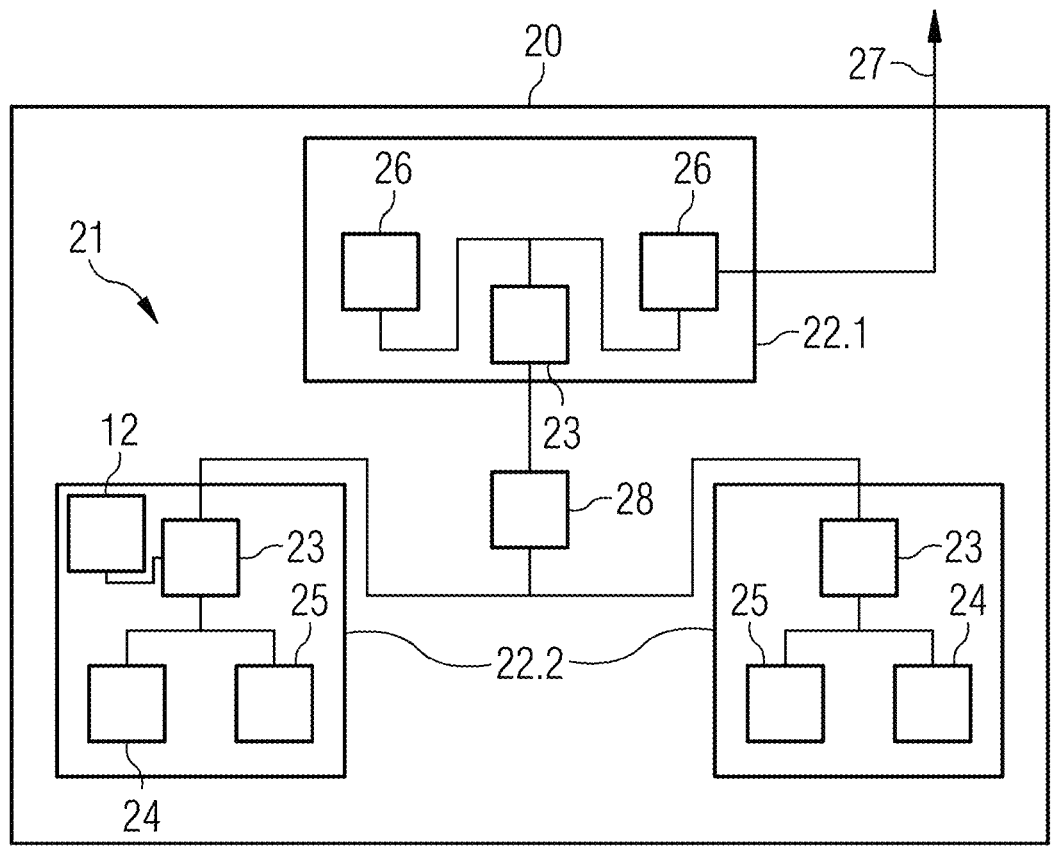
FIG. 5 shows a schematic view of one embodiment of a system including a network with a regular switch and yet another embodiment of the device.

In FIGS. 3 to 5, one embodiment of a system 20 including a network 21 with a regular switch 28 and a device 12 for recognizing deviations in communication behavior of the network 21 is schematically depicted. The embodiments depicted in the FIGS. 3 to 5 have different arrangements of the device 12 relative to the regular switch 28. In the following, only differences to the system 20 and network 21 of FIG. 2 are discussed. In FIGS. 3 to 5, the regular switch 28 connects the two network cells 22.2 and the control cell 22.1 with each other. In FIG. 3, the device 12 is communicatively coupled to the regular switch 12. In FIG. 4, the device 12 is located in the control cell 22.1 and communicatively connected to the regular switch 28 via the switch 23 of the control cell 22.1. In FIG. 5, the device 12 is located in one of the network cells 22.2 and communicatively connected to the regular switch 28 via the switch 23 of the respective network cell 22.2.

The device 12 is arranged and configured for implementing and executing the method of FIG. 1. Thereto, the device 12 includes a model of the communication behavior of the network 21 and a security module. The model of the communication behavior is communicatively connected to the security module. The communication metadata is fetched from the switch 28 by the device 12 for the model of the communication behavior. The model of the communication behavior is arranged and configured for implementing and executing the deriving 2 of the method of FIG. 1. The security module is arranged and configured for implementing and executing the generating 4 and optionally the spanning 5 of the method of FIG. 1.

Figure 6:
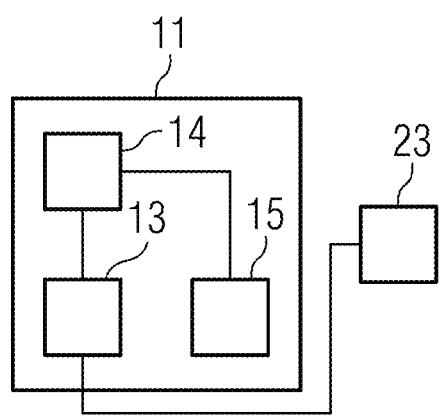
FIG. 6 shows a schematic view of one embodiment of an intelligent switch.

In FIG. 6, one embodiment of an intelligent switch 11 is schematically depicted. The intelligent switch 11 is connected to the control cell and the network cells at corresponding switches 23 of the respective control/network cells. The intelligent switch 11 includes a metadata module 13, a model 14 of the communication behavior of the network 21, and a security module 15. The metadata module 13 is communicatively connected to the model 14 of the communication behavior, which is communicatively connected to the security module 15.

Messages traversing the intelligent switch 11 from the switch 23 of one control/network cell to the switch 23 of another control/network cell are assessed by the metadata module 13 regarding the above-mentioned characteristics of communications. The communication metadata of each communication over the intelligent switch 11 is generated and stored (e.g., temporarily stored). The communication metadata of each communication over the intelligent switch 11 is forwarded from the metadata module 13 to the model 14 of the communication behavior or fetched by the model 14 of the communication behavior from the metadata module 13. The model 14 of the communication behavior derives the three security values and generates a corresponding 3D security point for each communication over the intelligent switch 11. Each 3D security point is forwarded to or fetched by the security module 15. The security module 15 checks whether the security points lie within or on the envelope (e.g., space) in 3D Cartesian coordinates. In case one or a plurality of security points do not meet the threshold values spanning the envelope, as the one or the plurality of security points lie outside the envelope, the security module 15 generates a security warning, as described above.

Figure 7:
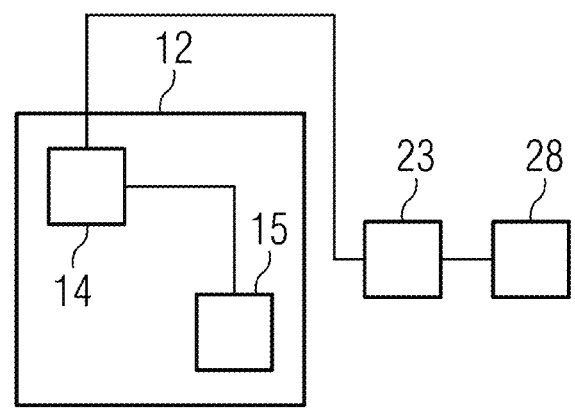
FIG. 7 shows a schematic view of one embodiment of a device.

In FIG. 7, one embodiment of a device 12 is schematically depicted. Only the differences to the intelligent switch will be described in the following. The device 12 is connected to the regular switch 28 of the network 21. The regular switch 28 is connected to the control cell and the network cells at corresponding switches of the respective control/network cells. The device 12 includes a model 14 of the communication behavior of the network 21 and a security module 15. The regular switch 28 is communicatively connected to the model 14 of the communication behavior of the device 12, which is communicatively connected to the security module 15.

Messages traversing the regular switch 28 from the switch of one control/network cell to the switch of another control/network cell are assessed by the regular switch 28 regarding the above-mentioned characteristics of communications, for example, in a metadata module of the regular switch 28. The communication metadata of each communication over the regular switch 28 is generated and stored (e.g., temporarily stored). The communication metadata of each communication over the regular switch 28 is forwarded to the model 14 of the communication behavior of the device 12 or fetched by the model 14 of the communication behavior of the device 12 from the regular switch 28 (e.g., from the metadata module of the regular switch 28).

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of recognizing deviations in communication behavior of a network, the method comprising:
collecting communication metadata in a switch of the network, wherein the communication metadata comprises data about characteristics of each communication over the switch;
deriving for each communication over the switch two or three security values from the communication metadata of the respective communication and threshold values derived during the generation of a model of the communication behavior derived from training communication metadata of the network, wherein the model selects values from the communication metadata that contribute to evaluation of the security of the network;
spanning a 2D envelope in a 2D domain or a 3D envelope in the 3D domain based on threshold values, the envelope defining a threshold area in the 2D domain or a threshold space in the 3D domain where all the respective threshold values are met by the respective security points, such that a security point of each communication over the switch is geometrically checkable relative to the threshold area or the threshold space defined by the envelope;
checking, for each communication over the switch, whether the respective at most three security values meet respective predetermined threshold values, the checking comprising geometrically checking, for each communication over the switch, whether the security point, which is defined by the derived two or three security values, lies within or on the envelope; and
generating a security warning in case at least one of the security points of the communication lies outside the envelope.

2. The method of claim 1, further comprising displaying, by a display, the security points and the envelope.

3. The method of claim 1, wherein generating the security warning comprises generating the security warning in case one or more security values of the two or three security values does not suffice with respect to the respective predetermined threshold value for a predefined number of communications, for a predefined duration, or for the predefined number of communications and for the predefined duration.

4. The method of claim 1, wherein deriving the two or three security values comprises pre-processing the communication metadata with a data cleansing function determining valid data of the communication metadata, and
wherein only the determined valid data are provided to the model of the communication behavior for deriving the at most three security values.

5. The method of claim 1, further comprising deriving the model of the communication behavior from training communication metadata by a forward feature selection algorithm, a backward feature selection algorithm, or the forward feature selection algorithm and the backward feature selection algorithm for deriving at most three security values describing the respective communication over the switch only considering security relevant data of communication metadata.

6. The method of claim 5, wherein the forward feature selection algorithm, the backward feature selection algorithm, or the forward feature selection algorithm and the backward feature selection algorithm are a support vector machine, a robust covariance, or an Isolation Forrest algorithm.

7. The method of claim 1, wherein the model of the communication behavior is based on an artificial neuronal network (ANN) trained with training communication metadata for deriving at most three security values describing a communication over the switch only considering security relevant data of communication metadata.

8. The method of claim 1, wherein the model of the communication behavior is derived from training communication metadata by an analytical algorithm for deriving at most three security values describing a communication over the switch only considering security relevant data of communication metadata.

9. The method of claim 5, wherein the training communication metadata is pre-processed with a data cleansing function determining valid training data of the training communication metadata, and
wherein only the determined valid training data is used for deriving the model of the communication behavior.

10. The method of claim 5, wherein the model of the communication behavior is a robust model derived from training communication metadata of communications in a regularly working network.

11. The method of claim 5, wherein the model of the communication behavior is derived from training communication metadata of communications in a network related to known attacks on the network.

12. The method of claim 5, wherein the model of the communication behavior is derived from training communication metadata of communications in an actually existing network, a currently operating network, or an actually existing and currently operating network.

13. The method of claim 5, wherein the model of the communication behavior is derived from training communication metadata of communications in a digital twin of the network.

14. An intelligent switch for recognizing deviations in communication behavior of a network, comprising:
a processor and a memory configured for executing:
a metadata module arranged and configured to collect communication metadata in the intelligent switch, wherein the communication metadata comprises data about characteristics of each communication over the intelligent switch;
a model of the communication behavior of the network communicatively coupled to the metadata module, the model being arranged and configured to derive, for each communication over the intelligent switch, two or three security values from the communication metadata of the respective communication, and threshold values derived during the generation of the model of the communication behavior derived from training communication metadata of the network, wherein the model selects values from the communication metadata that contribute to evaluation of the security of the network;
and a security module communicatively coupled to the model of the communication behavior, the security module being arranged and configured to: span a 2D envelope in a 2D domain or a 3D envelope in a 3D domain based on threshold values, the envelope defining a threshold area in the 2D domain or a threshold space in the 3D domain where all the respective threshold values are met by respective security points, such that a security point of each communication over the switch is geometrically checkable relative to the threshold area or the threshold space defined by the envelope; check, for each communication over the intelligent switch, whether the respective two or three security values meet respective predetermined threshold values, the check comprising a geometric check of whether the security point, which is defined by the derived two or three security values, lies within or on the envelope; and generate a security warning in case at least one of the security points of the communication lies outside the envelope.

15. The intelligent switch of claim 14, wherein the generation of the security warning comprises generation of the security warning in case one or more security values of the two or three security values does not suffice with respect to the respective predetermined threshold value for a predefined number of communications, for a predefined duration, or for the predefined number of communications and for the predefined duration.

16. A device for recognizing deviations in communication behavior of a network, the device comprising:
  a processor and a memory configured for implementing and executing a method, the device being communicatively connectable to a switch of the network, the device further comprising:
  a model of the communication behavior of the network, the model being arranged and configured to derive, for each communication over the switch, two or three security values from communication metadata of the respective communication fetched from the switch, wherein the communication metadata comprises data about characteristics of each communication over the switch, and to derive threshold values from the generation of the model of the communication behavior derived from training communication metadata of the network, wherein the model selects values from the communication metadata that contribute to evaluation of the security of the network; and
  a security module communicatively coupled to the model of the communication behavior, the security module being arranged and configured to:
  span a 2D envelope in the 2D domain or a 3D envelope in the 3D domain based on threshold values, the envelope defining a threshold area in the 2D domain or a threshold space in the 3D domain where all the respective threshold values are met by the respective security points, such that a security point of each communication over the switch is geometrically checkable relative to the threshold area or the threshold space defined by the envelope;
  check, for each communication over the switch, whether the respective two or three security values meet respective predetermined threshold values, the check comprising a geometric check, for each communication over the switch, whether the security point, which is defined by the derived security values, lies within or on the envelope;
  when the respective security point lies outside the envelope, determine a distance of the respective security point to the envelope, the determined distance identifying a severity of a security issue, and generate a security warning in case at least one of the security points of the communication lies outside the envelope.

17. The device of claim 16, wherein the generation of the security warning comprises generation of the security warning in case one or more security values of the two or three security values does not suffice with respect to the respective predetermined threshold value for a predefined number of communications, for a predefined duration, or for the predefined number of communications and for the predefined duration.

18. The device of claim 16, wherein the device is an edge device coupleable to the switch.

19. A system arranged and configured for recognizing deviations in communication behavior of a network, the system comprising:
  a network;
  at least two network cells communicatively connected over the network; and
  an intelligent switch for recognizing deviations in communication behavior of the network, the intelligent switch comprising:
    a processor and a memory, configured for executing:
    a metadata module arranged and configured to collect communication metadata in the intelligent switch, wherein the communication metadata comprises data about characteristics of each communication over the intelligent switch;
    a model of the communication behavior of the network communicatively coupled to the metadata module, the model being arranged and configured to derive, for each communication over the intelligent switch, two or three security values from the communication metadata of the respective communication, and threshold values derived during the generation of the model of the communication behavior derived from training communication metadata of the network, wherein the model selects values from the communication metadata that contribute to evaluation of the security of the network; and
    a security module communicatively coupled to the model of the communication behavior, the security module being arranged and configured to:
    span a 2D envelope in a 2D domain or a 3D envelope in a 3D domain based on threshold values, the envelope defining a threshold area in the 2D domain or a threshold space in the 3D domain where all respective threshold values are met by the respective security points, such that a security point of each communication over the switch is geometrically checkable relative to the threshold area or the threshold space defined by the envelope;
    check, for each communication over the intelligent switch, whether the respective two or three security values meet respective predetermined threshold values, the check comprising a geometric check of whether the security point, which is defined by the derived two or three security values, lies within or on the envelope; and generate a security warning in case at least one of the security points of the communication lies outside the envelope; or a regular switch and a device for recognizing the deviations in the communication behavior of the network, the device being communicatively connected or coupled to the regular switch, the device comprising: the model of the communication behavior of the network, the model being arranged and configured to derive, for each communication over the regular switch, the two or three security values from the communication metadata of the respective communication fetched from the regular switch, and to derive the threshold values from the generation of the model of the communication behavior derived from the training of the communication metadata of the network; and the security module communicatively coupled to the model of the communication behavior of the network, the security module being arranged and configured to span the 2D envelope in the 2D domain or the 3D envelope in the 3D domain based on the threshold values, check, for each communication over the regular switch, whether the respective two or three security values meet the respective predetermined threshold values, the check comprising the check, for each communication over the regular switch, whether the security point, which is defined by the derived security values, lies within or on the envelope, and generate the security warning in case at least one of the security points of the communication lies outside the envelope, wherein the intelligent switch or the regular switch is located at a central connection point of the at least two network cells in the network.

20. The method of claim 1, wherein the two or three security values define a security point of the respective communication in a two-dimensional (2D) domain or a three-dimensional (3D) domain.

21. A method of recognizing deviations in communication behavior of a network, the method comprising:

collecting communication metadata in a switch of the network, wherein the communication metadata comprises data about characteristics of each communication over the switch;

deriving for each communication over the switch two or three security values from the communication metadata of the respective communication and threshold values derived during the generation of a model of the communication behavior derived from training communication metadata of the network, wherein the model selects values from the communication metadata that contribute to evaluation of the security of the network;

spanning a 2D envelope in a 2D domain or a 3D envelope in the 3D domain based on the threshold values derived during the generation of the model of the communication behavior derived from the training of the communication metadata of the network, the 2D envelope defining a threshold area in the 2D domain or a threshold space in the 3D domain where all the respective threshold values are met by the respective security points, such that a security point of each communication over the switch is geometrically checkable relative to the threshold area or the threshold space defined by the envelope;

checking, for each communication over the switch, whether the respective at most three security values meet respective predetermined threshold values, the checking comprising geometrically checking, for each communication over the switch, whether the security point, which is defined by the derived two or three security values, lies within or on the envelope; and generating a security warning in case at least one of the security points of the communication lies outside the envelope.

* * * * *